(12) United States Patent
Kuno (10) Patent No.: US 11,474,542 B2
(45) Date of Patent: Oct. 18, 2022

(54) MOVING BODY

(71) Applicant: AISIN CORPORATION, Kariya (JP)

(72) Inventor: Kazuhiro Kuno, Kariya (JP)

(73) Assignee: AISIN CORPORATION, Kariya (JP)

( * ) Notice: Subject to any disclaimer, the term of this patent is extended or adjusted under 35 U.S.C. 154(b) by 233 days.

(21) Appl. No.: 16/652,100

(22) PCT Filed: Mar. 26, 2019

(86) PCT No.: PCT/JP2019/012691
§ 371 (c)(1),
(2) Date: Mar. 30, 2020

(87) PCT Pub. No.: WO2019/189080
PCT Pub. Date: Oct. 3, 2019

(65) Prior Publication Data
US 2020/0310469 A1    Oct. 1, 2020

(30) Foreign Application Priority Data

Mar. 29, 2018   (JP) .............................. JP2018-065517

(51) Int. Cl.
*G05D 1/00* (2006.01)
*G05D 1/12* (2006.01)
*G05D 1/02* (2020.01)

(52) U.S. Cl.
CPC ............. *G05D 1/12* (2013.01); *G05D 1/0094* (2013.01); *G05D 1/0214* (2013.01); *G05D 2201/0207* (2013.01)

(58) Field of Classification Search
CPC ......... G05D 2201/0207; G05D 1/0204; G05D 1/0094; G05D 1/12; G05D 1/0246;
(Continued)

(56) References Cited

U.S. PATENT DOCUMENTS

| 2006/0106496 | A1 | 5/2006 | Okamoto |
| 2019/0064838 | A1 | 2/2019 | Kuno |

FOREIGN PATENT DOCUMENTS

| CN | 108027616 A | 5/2018 |
| EP | 2169506 A2 | 3/2010 |

(Continued)

OTHER PUBLICATIONS

Translation of JP2007316924AI to Kitahama et al. (Year: 2006).*
(Continued)

*Primary Examiner* — Kenneth J Malkowski
*Assistant Examiner* — Carville Albert Hollingsworth, IV
(74) *Attorney, Agent, or Firm* — Oliff PLC (57) ABSTRACT

According to a moving body, position and direction of a user are calculated from distance measurement data, and on the basis thereof, the position and direction of the moving body are calculated. If the moving body is located in the first or fourth quadrant of the user coordinate system, a right-side moving target is set as the moving target. If the moving body is in the second or the third quadrant of the user coordinate system, a left-side moving target is set as the moving target. Accordingly, the moving target is set on the basis of the position of the moving body with respect to the user, so the moving body is prevented from cutting across in front of the user while its travelling.

4 Claims, 9 Drawing Sheets

(58) Field of Classification Search
CPC ...... G05D 1/0088; G05D 1/02; G05D 1/0255;
G05D 2201/0216; G05D 1/0242; G05D
15/01; G05D 2201/0217; G05D 1/024;
G05D 1/0214; B62D 49/06; B62D
15/027; B62D 15/0285; B62D 15/025;
B60R 21/00; G05B 2219/41244
See application file for complete search history.

(56) References Cited

FOREIGN PATENT DOCUMENTS

| | | | |
|---|---|---|---|
| EP | 3399378 | A1 | 11/2018 |
| FR | 3048406 | A1 | 9/2017 |
| JP | 2007-316924 | A | 12/2007 |
| JP | 2007316924 | A * | 12/2007 |
| JP | 2008-234404 | A | 10/2008 |
| JP | 2008-307658 | A | 12/2008 |
| JP | 2016-184337 | A | 10/2016 |
| JP | 2016184337 | A * | 10/2016 |
| JP | 2017-120495 | A | 7/2017 |
| JP | 2017-129908 | A | 7/2017 |
| WO | 2017/115548 | A1 | 7/2017 |

OTHER PUBLICATIONS

Translation of JP2016184337A to Watanabe et al. (Year: 2016).*
Jun. 18, 2019 International Search Report issued in International Patent Application No. PCT/JP2019/012691.
Jun. 18, 2019 Written Opinion issued in International Patent Application No. PCT/JP2019/012691.
Sep. 2, 2021 Search Report issued in European Patent Application No. 19774881.7.

* cited by examiner

MOVING BODY

TECHNICAL FIELD

The present invention relates to a moving body, in particular, to a moving body for which traveling such as cutting across in front of a target can be restrained.

BACKGROUND

In Patent Literature 1, a moving robot 1 is disclosed that conduct following action while maintaining a predetermined diagonally forward and relative position to a moving target 2. The moving robot 1 detects an orientation of the target 2 by a camera and the like and determines a target position of the moving robot 1 corresponding to the detected orientation of the target 2. The moving robot 1 calculates a travel route to the determined target position and moves.

In Patent Literature 2, an autonomous mobile device following and moving to an owner B while retaining a relative position (basic position) set beforehand by the owner B is disclosed. When the autonomous mobile device 1 detects a dangerous object, the autonomous mobile device 1 moves while interrupting between the dangerous object and the owner B depending on the degree of danger, thereby securing safety of the owner B. On the other hand, in a case where the dangerous object disappears, the autonomous mobile device follows and moves to the owner B while retaining the original basic position.

CITATION LIST

Patent Literature

[Patent Literature 1] Japanese Laid-Open Patent Publication No. 2008-234404
[Patent literature 2] Japanese Laid-Open Patent Publication No. 2008-307658

SUMMARY OF THE INVENTION

Problems to be Solved by the Invention

However, in a case where the moving robot 1 (autonomous mobile device 1) follows in front of the target 2 (owner B), when the target 2 turns, the moving robot 1 may cut across in front of the target 2. For example, when the moving robot 1 operates to follow in right front of the target 2 and the moving robot 1 is positioned left front of the target 2 as a result of the target 2 turning right, the moving robot 1 cuts across in front of the target 2 in order to move to right front of the target 2 where is an original following position. This may cause the target 2 to have a fear of collision with the moving robot 1 and may cause discomfort such as difficulty to walk.

The present invention has been made to solve the above-described problem, and an object of the present invention is to provide a moving body for which traveling such as cutting across in front of the target can be restrained.

Means for Solving the Problems

In order to achieve this object, a moving body according to the present invention is provided with a movement unit with which the moving body moves following a target in the right front or left front of the target. The moving body includes a detecting unit for detecting the target, a moving target calculation unit for calculating a moving target for the moving body with respect to the target based on a detection result by the detecting unit, a movement control unit for controlling the moving body so that the moving body moves to the moving target calculated by the moving target calculation unit. The moving target calculation unit is provided with a moving target setting unit and calculates the moving target set by the moving target setting unit. In a coordinate system in which the target is constituted as a coordinate origin, assuming that the orientation of the target is y-axis direction, the moving target setting unit sets the moving target to the right front of the target when the moving body is located in the first or fourth quadrant and sets the moving target to the left front of the target when the moving body is located in the second or third quadrant.

Effects of the Invention

According to the moving body of the present invention, the moving body moves following the target in the right front or left front of the target, the moving target of the moving body with respect to the target is calculated based on the detection result of the target, and the moving body is controlled so that the moving body moves to the moving target. In a coordinate system in which the target is constituted as a coordinate origin, assuming that the orientation of the target is y-axis direction, the moving target calculation unit sets the moving target to the right front of the target when the moving body is located in the first or fourth quadrant and sets the moving target to the left front of the target when the moving body is located in the second or third quadrant. Therefore, as a result of the target turning, even if the moving body moves to the left side from the right side of the target or moves to the right side from the left side, since the moving target of the moving body is set based on a position of the moving body with respect to the target, it can be possible for the moving body to travel while being restrained from cutting across in front of the target.

BRIEF DESCRIPTION OF THE DRAWINGS

FIG. 2(*a*) is a view indicating a moving target when the moving body is located at the right side of a user.
FIG. 2(*b*) is a view indicating the moving target when the moving body is located at the left side of the user.

DESCRIPTION OF THE PREFERRED EMBODIMENT

Figure 1:
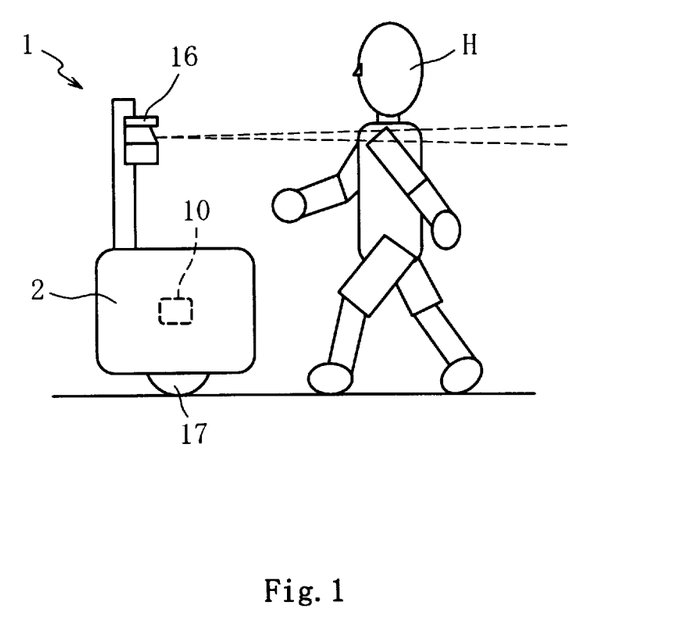
FIG. 1 is an external view of a moving body.

Hereinafter, preferred embodiments of the present invention will be described with reference to the accompanying drawings. First, with reference to FIG. 1, a configuration of a moving body 1 according to the present embodiment will be described. FIG. 1 is an external view of the moving body 1. The moving body 1 moves to an appropriate position with respect to a user H in right front or left front of the user H (target), thereby functioning as a device which can follow the user H.

As shown in FIG. 1, the moving body 1 mainly includes a substantially cylindrical outer case 2, a control unit 10 provided in the outer case 2 and controlling each part of the moving body 1, a distance measurement sensor 16, and wheels 17. The distance measurement sensor 16 is a device arranged on an upper part of the outer case 2 and detecting a distance (distance measurement) between the distance measurement sensor 16 and an object by irradiating laser light in all directions (360°). The distance measurement sensor 16 transmits a distance to the detected object to the control unit 10 in association with the angle to the control unit 10. Further, the distance measurement sensor 16 is configured to be movable in vertical direction and the position of the distance measurement sensor 16 in the vertical direction is appropriately set so that the laser light from the distance measurement sensor 16 is irradiated in advance to the periphery of the shoulder of the user H. Hereinafter, the distance and the angle detected by the distance measurement sensor 16 are referred to as "distance measurement data".

A pair of left and right wheels 17 are provided facing each other at a bottom part of the outer case 2. A motor (not shown) is connected to each of the left and right wheels 17, and the moving body 1 is moved by driving the motors based on a control signal from a drive unit 18 (see FIG. 3) described later. Forward movement and backward movement of the moving body 1 are conducted by normally and reversely rotating the left and right motors with the same output and change of movement direction of the moving body 1 is conducted by differentially rotating the motors. When the moving body 1 moves in the left and right direction, it is necessary to change the moving direction of the moving body 1 since the moving body 1 cannot directly move in left and right directions along which the wheels 17 are provided. That is, the moving body 1 moves through the wheels 17 and the drive unit 18 (moving part) having non-holonomic restraint condition.

Next, with reference to FIGS. 2(a) and 2(b), a moving target $T_1$ for movement of the moving body 1 will be described. FIG. 2(a) is a view indicating a moving target $T_1$ when the moving body 1 is located at the right side of the user H and FIG. 2(b) is a view indicating the moving target $T_1$ when the moving body 1 is located at the left side of the user H.

The movement control of the moving body 1 is performed by processing the distance measurement data MP obtained from the distance measurement sensor 16 based on both a "user coordinate system" and a "moving body coordinate system". In the "user coordinate system", the position Pu of the user H is the origin (0,0), the direction of the orientation Du of the user H is defined as the yu axis, and the direction orthogonal to the yu axis is defined as the xu axis, and in the "moving body coordinate system", the position Pr of the moving body 1 is the origin (0,0), the direction of the orientation Dr of the moving body 1 is defined as the yr axis, and the direction orthogonal to the yr axis is defined as the xr axis.

Figure 2:
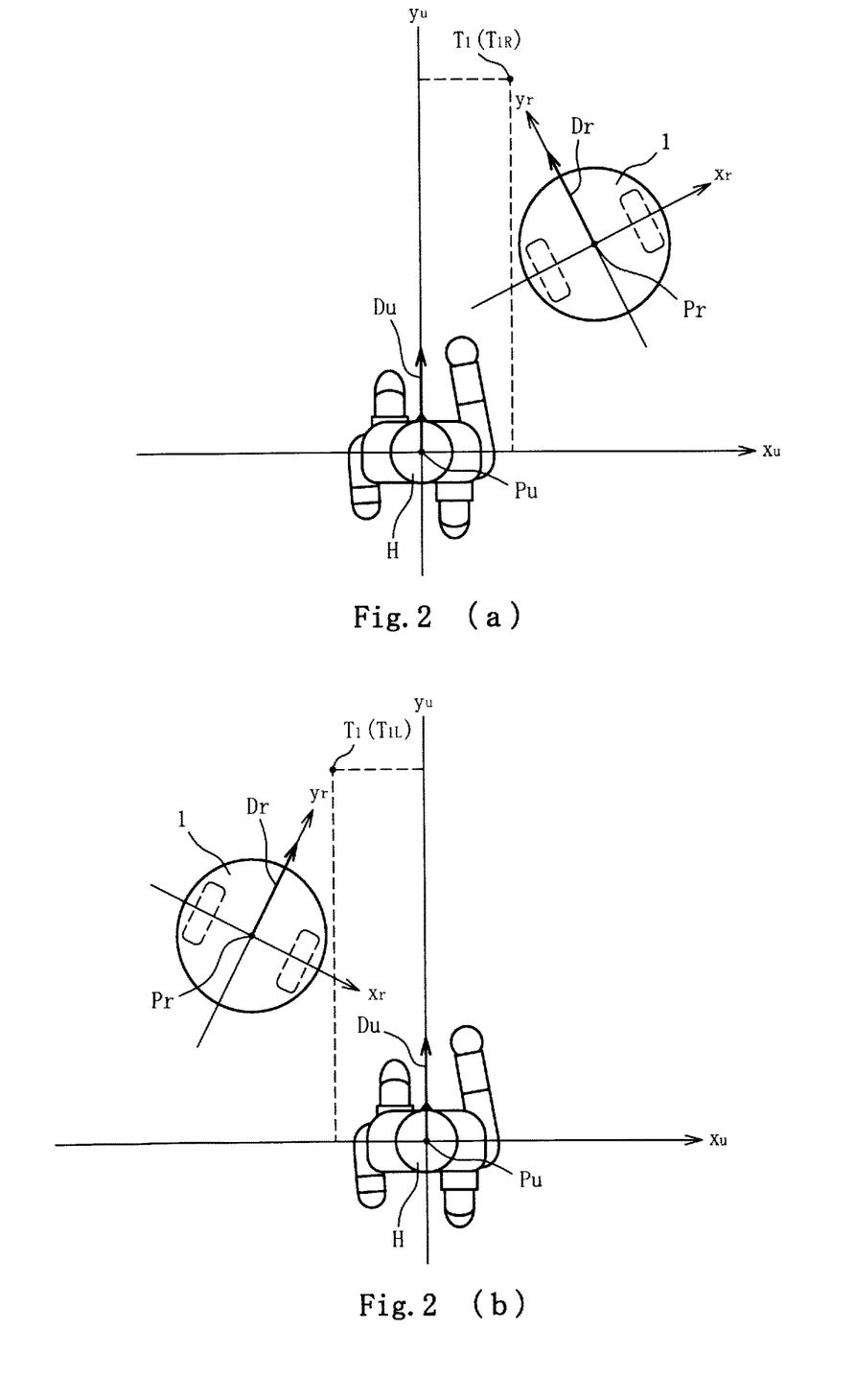

In the present embodiment, as shown in FIG. 2 (a), when the moving body 1 is located at the right side of the user H, that is, the moving body 1 is located in a first or fourth quadrant of the user coordinate system, a right-side moving target $T_{1R}$ in right front of the user H is set as the moving target $T_1$. On the other hand, as shown in FIG. 2 (b), when the moving body 1 is located at the left side of the user H, that is, the moving body 1 is located in a second or third quadrant in the user coordinate system, a left-side moving target $T_{1L}$ in left front of the user H is set as the moving target $T_1$ of the moving body 1. The movement control of the moving body 1 is conducted based on the set moving target $T_1$. Thus, the moving body 1 can move following with the user H in the right or left front of the user H while changing the moving target $T_1$ to the right-side moving target $T_{1R}$ or the left-side moving target $T_{1L}$ appropriately based on the position with respect to the user H.

Here, in the present embodiment, the right-side moving target $T_{1R}$ is defined as a position of front side "0.6 m" and right side "0.3 m" of the user H and the left-side moving target $T_{1L}$ is defined as a position of front side "0.6 m" and left side "0.3 m" of the user H. Further, in the initial state immediately after the power of the moving body 1 is turned on, the moving target $T_1$ is set as the right-side moving target $T_{1R}$, thereafter the moving target $T_1$ is set as the right-side moving target $T_{1R}$ or the left-side moving target $T_{1L}$ based on the position of the moving body 1 and the user H.

Figure 3:
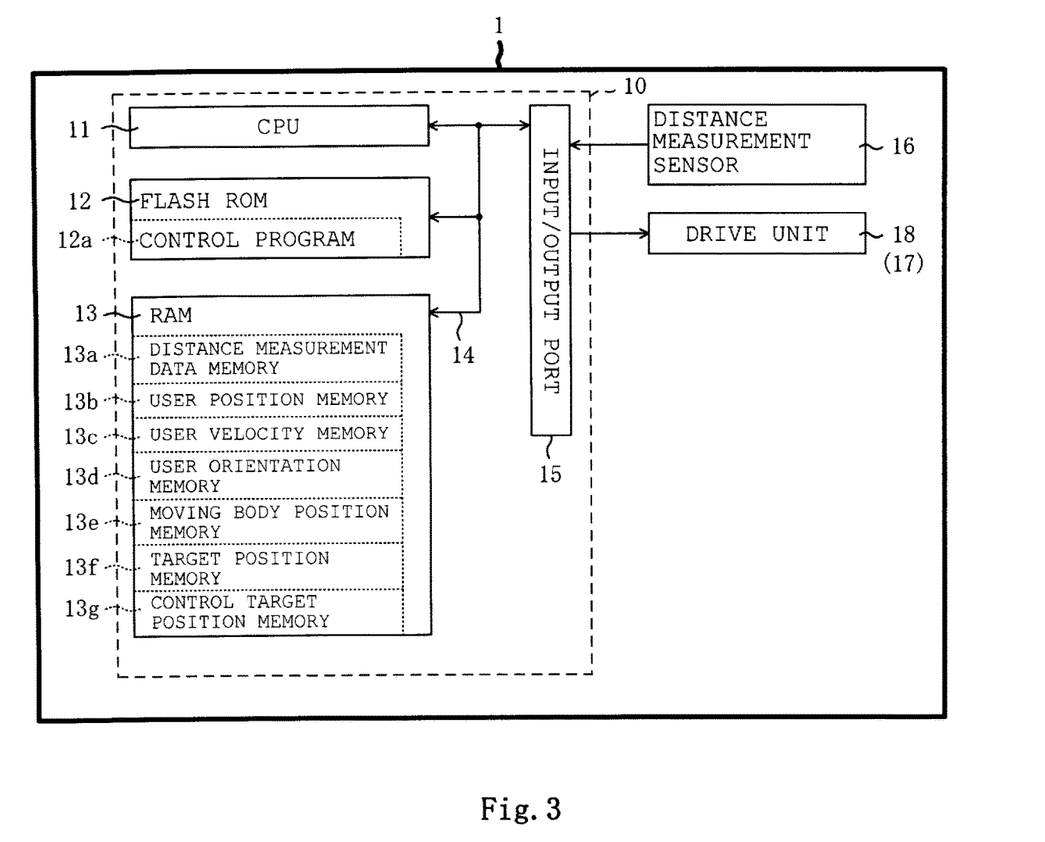
FIG. 3 is a block diagram indicating an electrical configuration of the moving body.

Next, with reference to FIG. 3, an electrical configuration of the moving body 1 will be described. FIG. 3 is a block diagram indicating an electric configuration of the moving body 1. The moving body 1 includes the control unit 10 having a CPU 11, a flash ROM 12 and a RAM 13 which are respectively connected to an input/output port 15 through a bus line 14. The distance measurement sensor 16 and the drive unit 18 are further connected to the input/output port 15.

Figure 4:
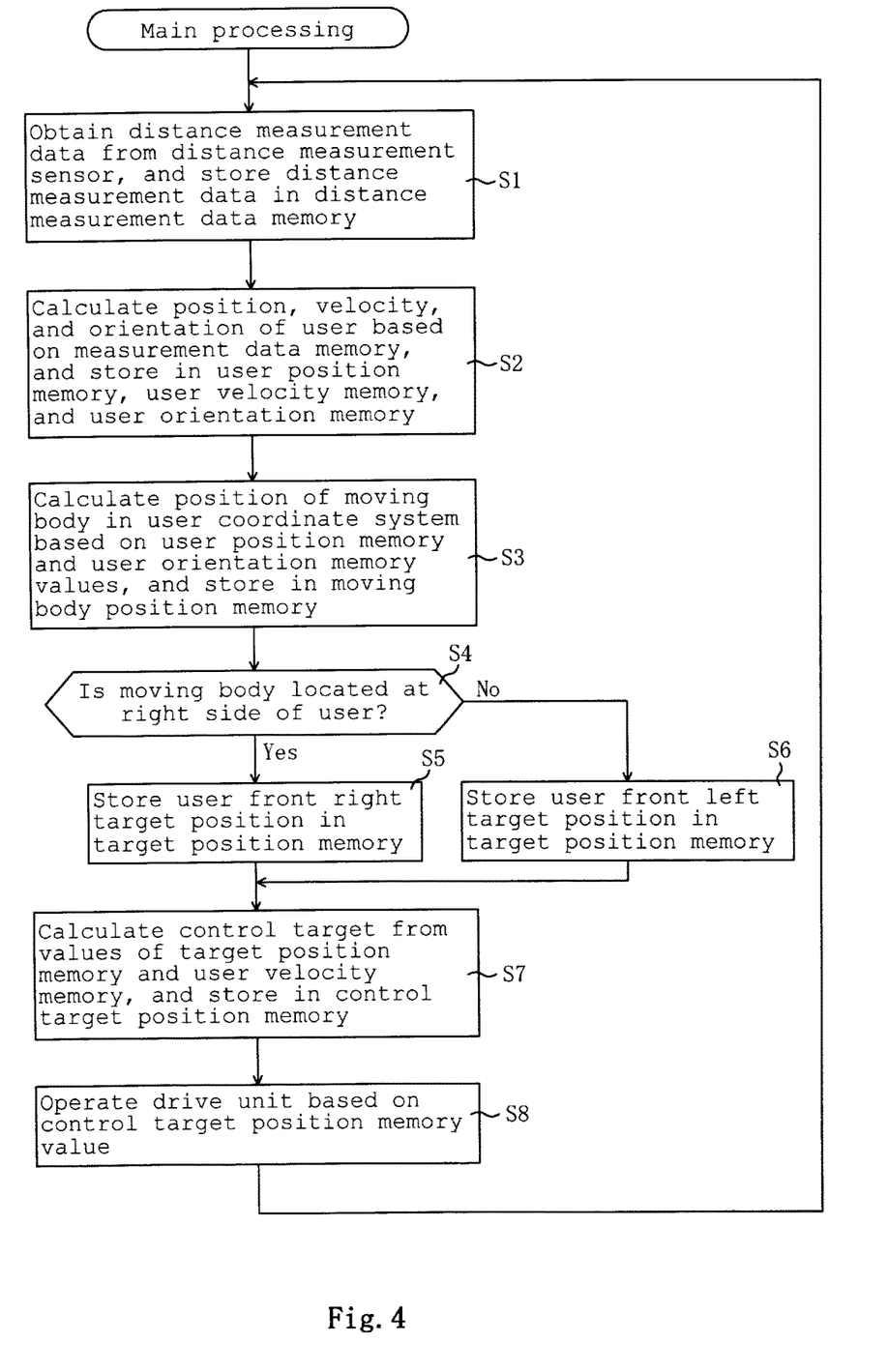
FIG. 4 is a flowchart of the moving body.

The CPU 11 is an arithmetic device for controlling the respective sections mutually connected with the bus line 14. A control program 12a is stored in the flash ROM 12 as a non-volatile rewritable memory device for storing the program executed by the CPU 11 and data of fixed values. Upon execution of the control program 12a by the CPU 11, a main processing shown in FIG. 4 is executed.

The RAM 13 is a memory for storing rewritably various work data and flags and the like in execution of the control program 12a by the CPU 11, and includes a distance measurement data memory 13a in which distance measurement data MP measured by the distance measurement sensor 16, a user position memory 13b in which a position Pu of the user H is stored, a user velocity memory 13c in which a velocity Vu of the user H is stored, a user orientation memory 13d in which an orientation Du of the user H is stored, a moving body position memory 13e in which a position Pr of the moving body 1 is stored, a target position memory 13f in which the moving target $T_1$ of the moving body 1 is stored, and a control target position memory 13g in which a control target $T_2$ (see FIG. 5) of the moving body 1 is stored.

In the present embodiment, each value of the user position memory 13b and the user orientation memory 13d is defined as a value on the basis of the moving body coordinate system mentioned in the above and each value of the moving body position memory 13e, the target position memory 13f, and the control target position memory 13g is defined as a value on the basis of the user coordinate system.

The drive unit 18 is a device to move and operate the moving body 1, and is constituted from the wheels 17 (see FIG. 1), the motor (not shown) serving as a drive source of the wheels 17, and the like. When a control signal is input from the control unit 10 to the drive unit 18, the motor rotates based on the input control signal, and the wheels 17 are driven by the rotation of the motor to operate the moving body 1.

Next, with reference to FIG. 4, the main processing executed by the CPU 11 of the moving body 1 will be described. FIG. 4 is a flowchart of the main processing of the moving body 1. The main processing is executed immediately after the moving body 1 is powered on. In the main processing, first, the distance measurement data MP obtained from the distance measurement sensor 16 are stored in the distance measurement data memory 13a (S1).

Subsequent to the processing of S1, based on the distance measurement data MP of the distance measurement data memory 13a, the position Pu of the user H, the velocity Vu, and the orientation Du of the user H are calculated and respectively stored in the user position memory 13b, the user velocity memory 13c, and the user orientation memory 13d (S2). Since the distance measurement data MP are values based on the moving body 1, the position Pu of the user H and the orientation Du of the user H are calculated based on the moving body coordinate system.

After the processing of S2, the position Pr and the orientation Dr of the moving body 1 in the user coordinate system are calculated by performing coordinate transformation on the position Pu and the orientation Du of the user H in the moving body coordinate system, which are stored in the user position memory 13b and the user orientation memory 13d, and are respectively stored in the moving body position memory 13e (S3).

After the processing of S3, it is confirmed whether or not the position Pr of the moving body 1 in the moving body position memory 13e is located at the right side of the user H (S4). Specifically, since the position Pu of the user H in the user coordinate system is the origin (0,0), it is determined whether the position in xu-axis direction corresponding to the position Pr of the moving body 1 which is stored in the moving body position memory 13e is located at the more right side than the yu-axis, that is, more than 0.

In the processing of S4, when the position Pr of the moving body 1 in the moving body position memory 13e is located at the right side of the user H (S4: Yes), based on the position Pu of the user H in the user coordinate system (the origin (0,0) in the user coordinate system), the right-side moving target $T_{1R}$ (see FIG. 2 (a)) is calculated and stored in the target position memory 13f (S5).

On the other hand, in the processing of S4, when the position Pr of the moving body 1 in the moving body position memory 13e is located at the left side of the user H (S4: No), the left-side moving target $T_{1L}$ (see FIG. 2(b)) is calculated based on the position Pu of the user H in the user coordinate system and stored in the target position memory 13f (S6). By the processing of S4 to S6, when the moving body 1 is located at the right side of the user H, the right-side moving target $T_{1R}$ is set as the moving target $T_1$ and when the moving body 1 is located at the left side, the left-side moving target $T_{1L}$ is set as the moving target $T_1$.

In a case where the user H turns or the user H moves in the left and right direction, or further there is fluctuation in walking of the user H, the moving target $T_1$ is positioned not in the front-back direction but in the left and right direction of the moving body 1. As mentioned in the above, since the moving body 1 cannot directly move in the left and right direction, the moving body 1 moves following the user H by turning. Especially, when the user H moves right beside (along the xu-axis), it is necessary for the moving body 1 to make a sharp turn with the smallest turning radius. Further, since the distance between the moving body 1 and the moving target $T_1$ is relatively small, the turning radius of the moving body 1 becomes small when the moving body 1 is moved following the moving target $T_1$. Since the moving body 1 turns by differentiating the left and right wheels 17, the moving body 1 cannot turn enough even if the moving body 1 tries to make a sharp turn with a small turning radius. This may cause delay in movement following the user H and for the moving body 1 itself to be hindrance in walking of the user H.

Figure 5:
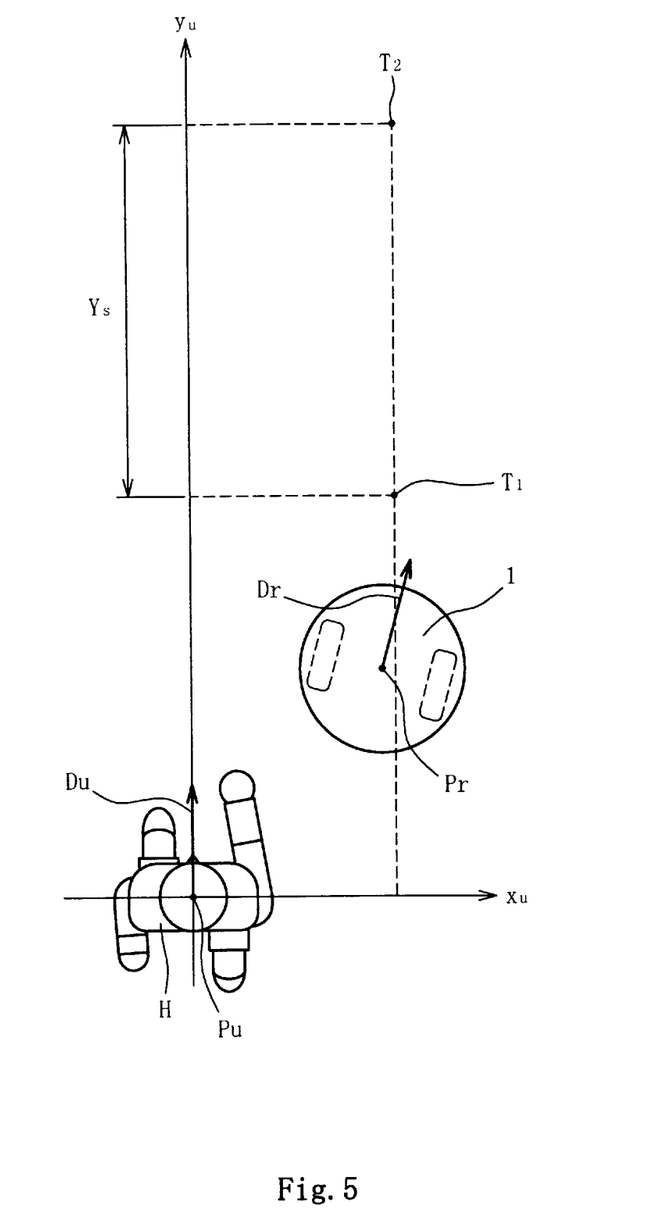
FIG. 5 is a view indicating a control target of the moving body.

In the present embodiment, to secure the turning radius of the moving body 1, the moving body 1 is moved following with respect to the control target $T_2$ which is in the more front side than the moving target T1. Specifically, after the processing of S5 or S6, the control target $T_2$ of the moving body 1 is calculated from the moving target $T_1$ in the target position memory 13f and the velocity Vu of the user H in the user velocity memory, and stored in the control target position memory 13g (S7). Referring to FIG. 5, a calculation of the control target $T_2$ of the moving body 1 by the processing of S7 will be described.

FIG. 5 is a view indicating the control target $T_2$ of the moving body 1. In FIG. 5, a case where the right-side moving target $T_{1R}$ is set as the moving target $T_1$ will be described. It should be noted that the same applies to a case where the left-side moving target $T_{1L}$ is set as the moving target $T_1$, therefore a description thereof will be omitted.

As shown in FIG. 5, by moving (shifting) the moving target $T_1$ to the yu-axis direction by Ys, the control target $T_2$ is set. Specifically, the shift amount Ys of the moving target $T_1$ is calculated by Formula 1 on the basis of the velocity Vu of the user H.

$$Ys = Vu \times \Delta T \quad \text{(Formula 1)}$$

In Formula 1, $\Delta T$ is a predetermined time interval and "1 second" is exemplified. That is, since the control target $T_2$ is a position where the distance that user H advances in one second is added to the moving target $T_1$, a distance between the moving body 1 and the moving target can be secured by the moving body 1 moving with the control target $T_2$ as the moving target T. Thus, the turning radius of the moving body 1 can be enlarged in comparison with a case where the moving body moves with the moving target $T_1$ as the moving target. Therefore, even if the user H turns sharply, the moving body 1 only needs to turn slowly along a large turning radius, so that the delay in the movement following the user H can be restrained and further prevent the moving body 1 itself from being hindrance in walking of the user H.

Referring back to FIG. 4, after the processing of S7, the control signal is output based on the control target $T_2$ of the control target position memory 13g and the drive unit 18 is driven, and the moving body 1 is moved (S8). After the processing of S8, subsequent processing after S1 are repeated.

With reference to FIGS. 6 to 9, the case where the moving target $T_1$ is changed to the left-side moving target $T_{1L}$ or the right-side moving target $T_{1R}$ according to the position Pr of the moving body 1 in the present embodiment and the case in the prior art where the moving target $T_1$ is fixed to the right front of the user H are compared with each other when the user H moves in a figure of eight.

Figure 6:
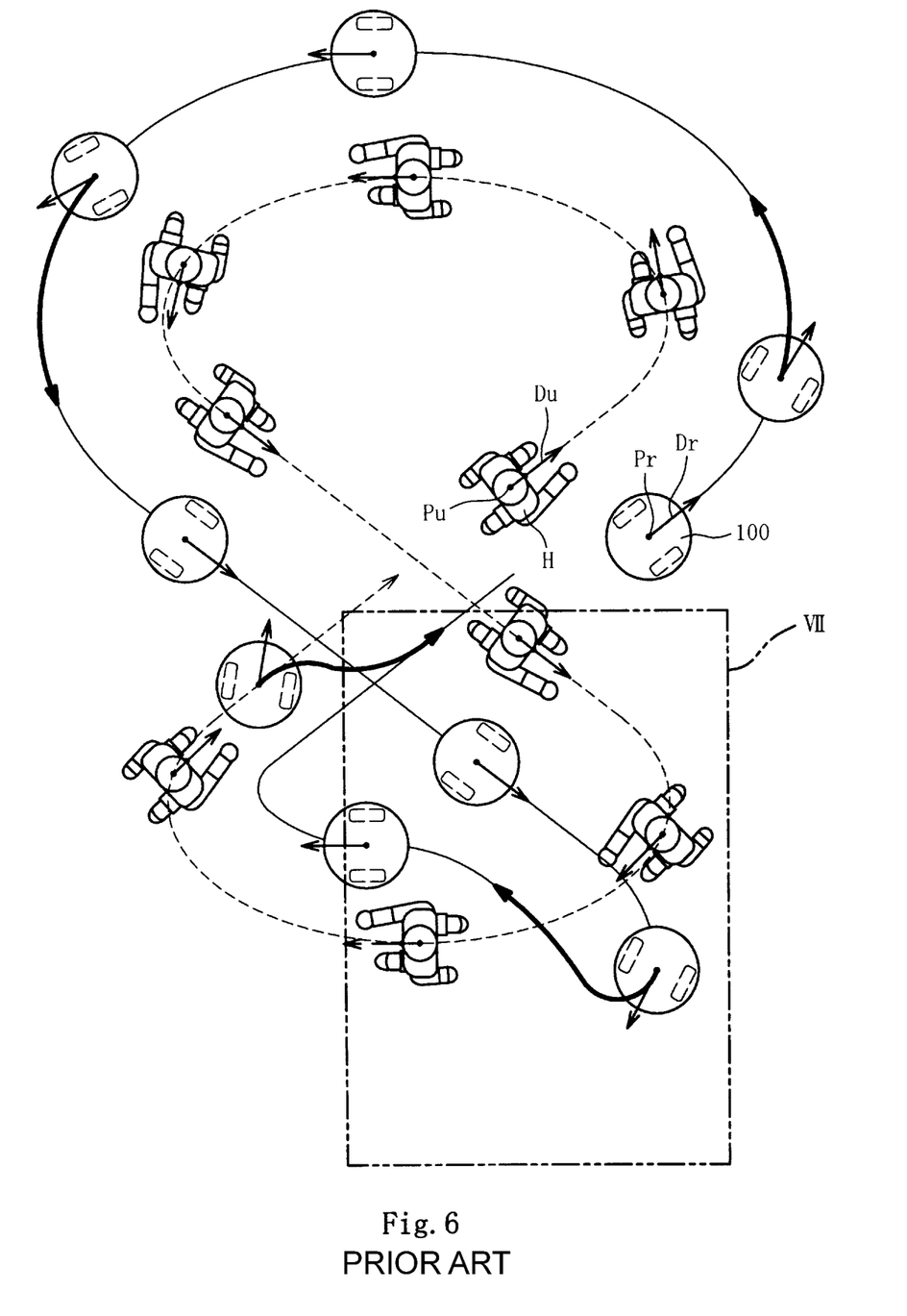
FIG. 6 is a view indicating a case where the moving body according to the prior art moves along the user moving in a figure of eight.
Figure 7:
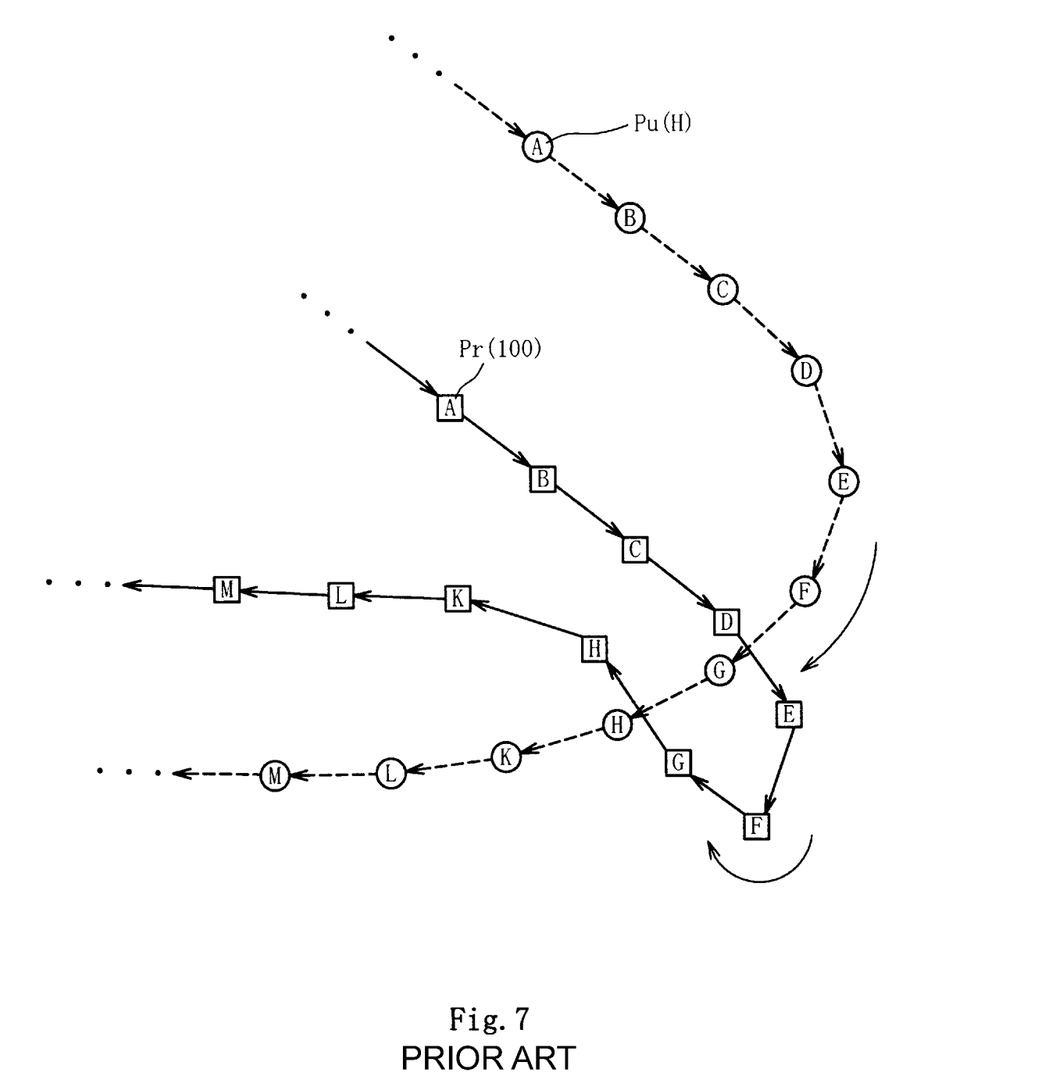
FIG. 7 is a view showing movement trajectories of the user and the moving body according to the prior art in VII part of FIG. 6 in detail.

First, with reference to FIGS. 6 and 7, the case in the prior art where the moving target $T_1$ is fixed to the right front (right-side moving target $T_{1R}$) and the user H moves in a figure of eight will be described. FIG. 6 is a view indicating a case where the moving body 100 in the prior art moves following the user H who moves in a figure of eight. FIG. 7 is a view indicating the detailed movement trajectories in VII part of FIG. 6 of the user H and the moving body 100 in the prior art. In FIGS. 6 and 7, the movement trajectory of the user H is shown by a dotted-line and the movement trajectory of the moving body 100 in the prior art is shown by a solid line.

As shown in FIG. 6, the user H moves so as to draw a figure of eight from the center portion of FIG. 6. The moving body 100 in the prior art moves so as to follow the user H in the right front thereof according to movement of the user H. Movement in a figure of eight by the user H represents the repeated movement of the left and right turn, thus at first, the user H makes a left turn from the center to the top in FIG. 6. When the user H make a left turn, the moving body 100 that moves following the user H in the right front thereof is located in a direction departing from the user H that makes a left turn. As a result, the moving body 100 does not cut across in front of the user H, thereby not being a hindrance of the user H movement. Therefore, the user H and the moving body 100 can move smoothly.

After that, the user H makes a right turn from the center to the lower part in FIG. 6. With reference to FIG. 7, the movement of the user H and the moving body 100 during the right turn will be described. In FIG. 7, the position Pu of the user H is shown as a not color-filled square and the position Pr of the moving body 100 is shown as a not color-filled circle. An alphabet (such as A, B, C, to M) in the not color-filled squares and circles represents a time point and the same alphabet in the not color-filled squares and circles represents the position Pu of the user H and the position Pr of the moving body 100 at the same time point.

As shown in FIG. 7, the user H makes a right turn through the time points A to M. Especially, since the user H changes direction sharply to the right at the time point F, the position Pr of the moving body 100 after the user H changing direction becomes at the left side with respect to the position Pu of the user H. As a result, the moving body 100 tries to follow the user H in the right front thereof, and thus, the moving body 100 moves so as to cut across in front of the user H through the time points F to G. Due to such a movement of the moving body 100, the user H may feel a fear of collision with the moving body 100 and discomfort such as a difficulty in walking by being blocked their course due to the moving body 100.

Furthermore, since the moving body 100 also changes direction sharply to the right at the time point F, the moving body 100 may lose its balance to fall down or the time necessary to change direction may cause a delay in the following the user H by the moving body 100.

Figure 8:
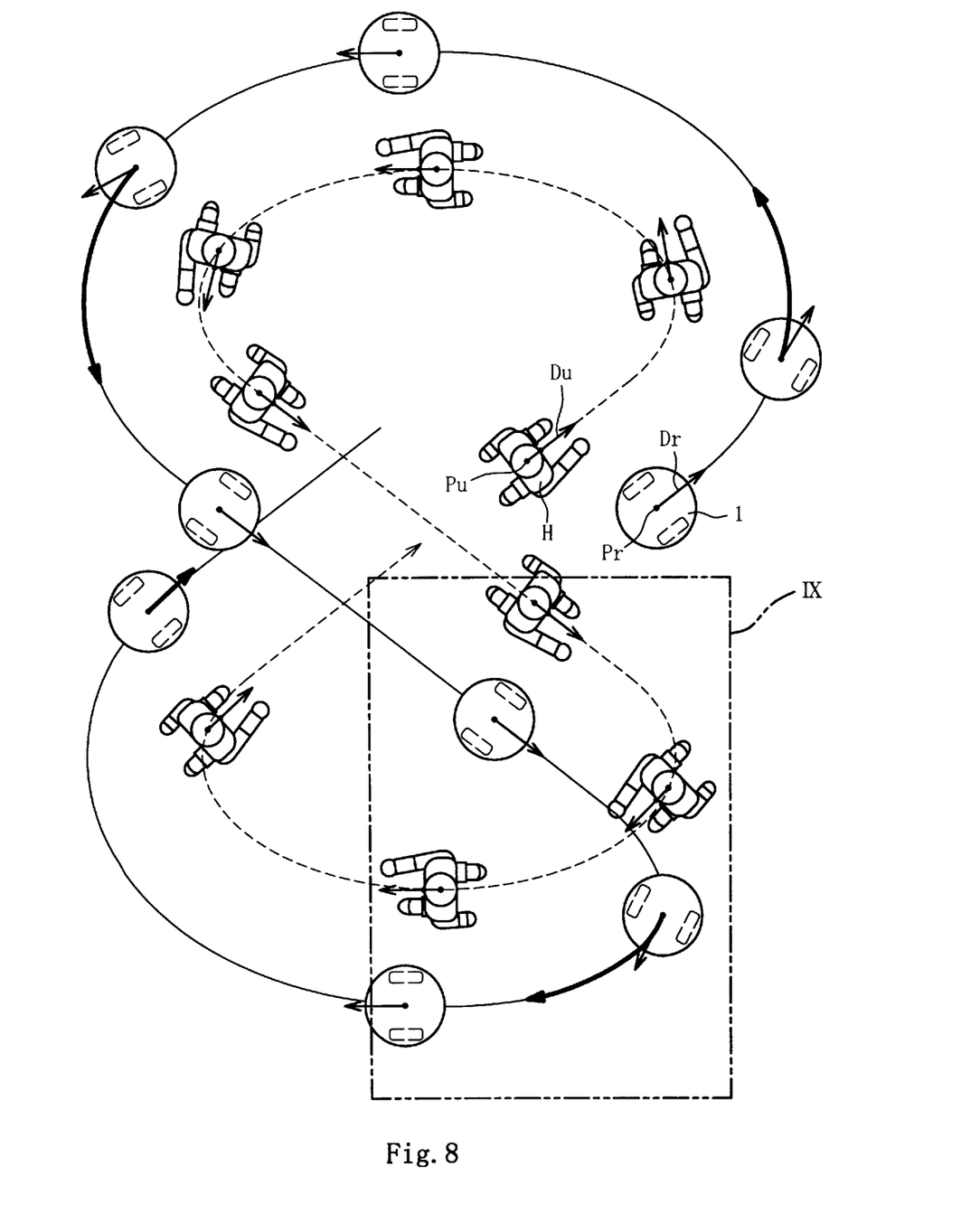
FIG. 8 is a view indicating a case where the moving body according to the present embodiment moves along the user moving in a figure of eight.
Figure 9:
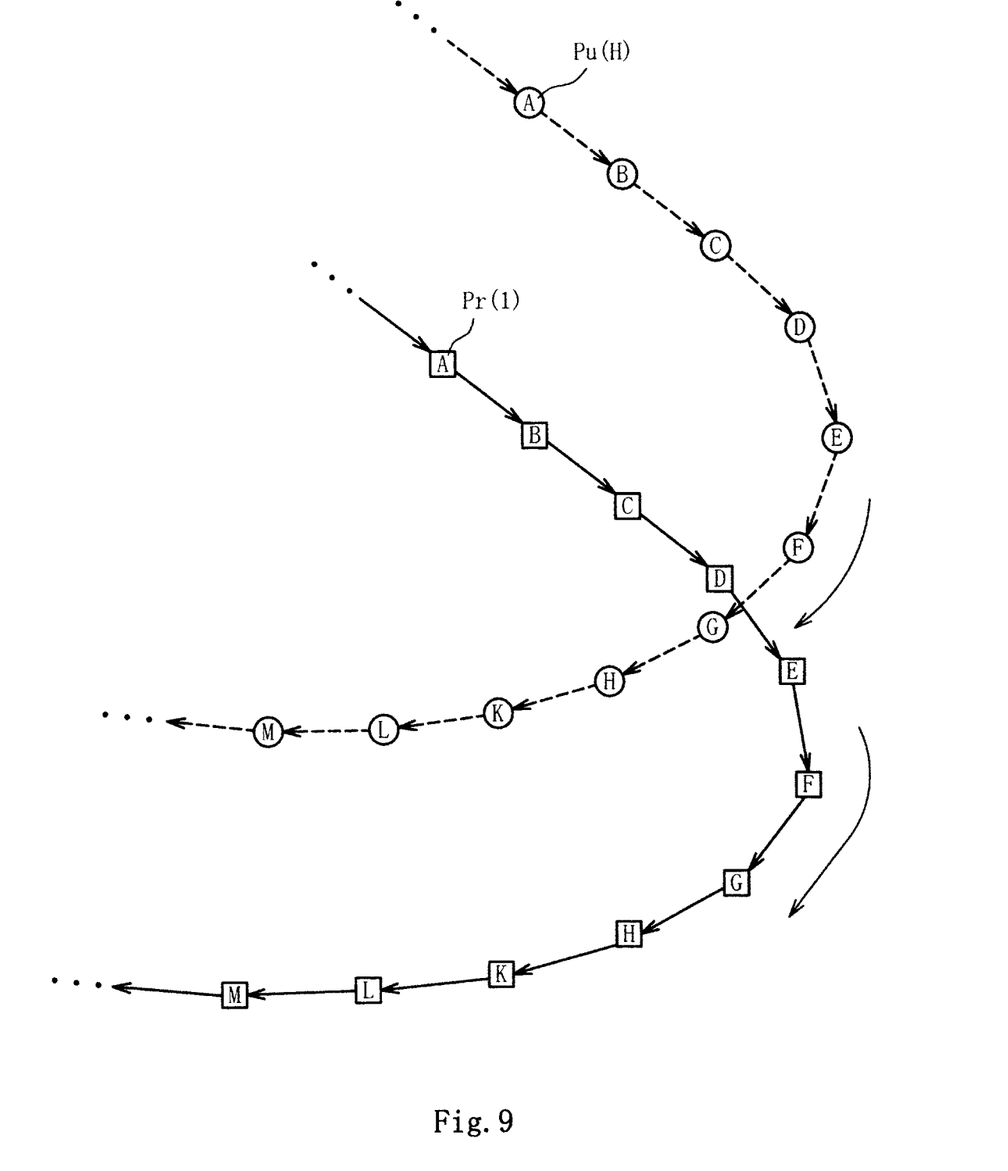
FIG. 9 is a view indicating movement trajectories of the user and the moving body of the present embodiment in IX part of FIG. 8 in detail.

Next, with reference to FIGS. 8 and 9, a case where the moving target $T_1$ is changed to the left-side moving target $T_{1L}$ or the right-side moving target $T_{1R}$ corresponding to the position Pr of the moving body 1 in the present embodiment will be described. FIG. 8 is a view indicating the case where the moving body 1 of the present embodiment moves following the user H moving in a figure of eight. FIG. 9 is a view indicating the detailed movement trajectories in IX part of FIG. 8 of the user H and the moving body 1 in the present embodiment. Also in FIGS. 8 and 9, the movement trajectory of the user H is shown by a dotted-line and the movement trajectory of the moving body 1 is shown by a solid line.

Also in FIG. 8, the user H make a left turn, the moving body 100 moves following the user H in the right front thereof, thereby smoothly moving without becoming hindrance of the movement of the user H. After that, the user H makes a right turn from the center to the lower part in FIG. 8. When the user H is located at the left side of the moving body 1 due to the right turn, the moving target $T_1$ of the moving body 1 is changed from the right-side moving target $T_{1R}$ to the left-side moving target $T_{1L}$, and the moving body 1 is moved based on the left-side moving target $T_{1L}$ at the left front of the user H. With reference to FIG. 9, the movement of the user H and the moving body 1 in a case of the right turn will be described.

In FIG. 9, as is the case with FIG. 7, the position Pu of the user H is shown as a not color-filled square and the position Pr of the moving body 1 is shown as a not color-filled circle. An alphabet in the not color-filled squares and circles represents a time point and the same alphabet in the not color-filled squares and circles represents the position Pu of the user H and the position Pr of the moving body 1 at the same time point.

As shown in FIG. 9, the user H makes a right turn through the time points A to M. Especially, due to the right turn of the user H at the time point F, the position Pr of the moving body 1 becomes at the left side with respect to the position Pu of the user H. In such a case, according to the moving body 1 of the present embodiment, the moving target $T_1$ is changed from the right-side moving target $T_{1R}$ to the left-side moving target $T_{1L}$ due to that the position Pr of the moving body 1 is changed to at the left side with respect to the position Pu of the user H.

As a result, when the position Pr of the moving body 1 that moves following the user H in the right front of the user H is changed to the left side with respect to the position Pu of the user H, the moving body 1 moves following the user H in the left front of the user H. Thus, the moving body 1 can be prevented from traveling cutting across in front of the user H due to the right turn of the user H and the like, thereby smoothly moving following the user H in the left front of the user H.

Further, unlike the moving body 100 of the prior art, the moving body 1 that has been changed to the left side with respect to the position Pu of the user H does not need to make a sharp turn in order to follow the user H in the right front of the user H, thus the behavior of the moving body 1 can be kept stable. Since the behavior of the moving body 1 is stabilized, the delay of the moving body 1 from the user H can be minimized.

Although not shown, when the right turn of the user H is finished and the user H changes direction to the left in order to make a left turn, the moving body 1 that has been following the user H in the left front of the user H comes to be located in the right side of the user H. In such a case, since the moving target $T_1$ is changed from the left-side moving target $T_{1L}$ to the right-side moving target $T_{1R}$, even when the user H changes from turning left to turning right, the moving body 1 can smoothly move following the user H in the right front of the user H without cutting across in front of the user H.

Although the present invention has been described based on embodiments, the present invention is not limited to the above-described embodiments in any way, and it can be easily understood that various improvements and modifications are possible within the spirit of the present invention.

In the above embodiments, the case where the right-side moving target $T_{1R}$ is set as the moving target $T_1$ in the initial state immediately after the moving body 1 is powered on has been described. However, the present invention is not necessarily limited thereto. The left-side moving target $T_{1L}$ may be set as the moving target $T_1$ in the initial state immediately after the moving body 1 is powered on.

In the above embodiments, the case where whether or not the moving body 1 is located at the right side of the user H is confirmed by whether or not the position of the position Pr of the moving body 1 in the xu-axis direction is equal to or larger than 0 has been described. However, the present invention is not necessarily limited thereto. Whether or not the position of the position Pr of the moving body 1 is located at the right side of the user H may be determined by whether or not the position of the position Pr in the xu-axis direction is equal to or larger than 0.

Further, a "dead region" in which the moving target $T_1$ is not changed to the left-side moving target $T_{1L}$ or the right-side moving target $T_{1R}$ may be provided in a predetermined range in the xu-axis direction around the yu-axis (e.g., in the range of 0.2 m right and left around the yu-axis), and if the position Pr is located at the right side than the dead region, the moving target $T_1$ is set as the right-side moving target $T_{1R}$, if the position Pr is located at the left side than the dead area, the moving target $T_1$ is set as the left-side moving target $T_{1L}$. With such a dead region, it is possible to prevent the moving target $T_1$ from being frequently changed from the left-side moving target $T_{1L}$ to the right-side moving target $T_{1R}$ and vise versa, when the moving body 1 is located near the yu axis. Therefore, vibration due to the movement of the moving body 1 in the left-right direction is reduced, and the moving body 1 can be stably moved.

In the above embodiments, the position Pu, the velocity Vu, and the orientation Du of the user H are calculated based on the distance measurement data obtained by the distance measurement sensor 16. However, the present invention is not necessarily limited thereto. The position Pu, the velocity Vu, and the orientation Du of the user H may be calculated based on images obtained by a camera that is installed instead of the distance measurement sensor 16.

In the above embodiments, the case where the control target $T_2$ is calculated by shifting the moving target $T_1$ in the yu-axis direction based on the velocity Vu of the user H, and based on the control target $T_2$ the drive unit 18 is driven has been described. However, the present invention is not necessarily limited thereto. The drive unit 18 may be driven based on the moving target $T_1$, or based on the position obtained by shifting the control target $T_2$ or the moving target $T_1$ in the xu-axis direction according to the orientation Dr and the like of the moving body 1.

The numerical values listed in the above embodiments are merely examples, and matter of course, it is possible to adopt other numerical values.

The invention claimed is:
1. A moving body comprising:
   a movement unit with which the moving body moves following a target, to the right front or the left front of the target;
   a sensor for detecting the target; and
   a processor programmed to
      calculate a moving target of the moving body with respect to the target based on a detection result by the sensor;
      control the movement unit so that the moving body moves to the calculated moving target;
      set a dead region in a predetermined range in an x-axis direction around a y-axis in a coordinate system with the target as an origin;
      set the moving target to the right front of the target when the moving body is located in a first quadrant or a fourth quadrant outside of the dead region, an orientation of the target being in a y-axis direction in the coordinate system;
      set the moving target to the left front of the target when the moving body is located in a second quadrant or a third quadrant outside of the dead region; and
      not set the moving target when the moving body is located inside of the dead region.
2. The moving body according to claim 1, wherein
   the sensor is constituted by a distance measurement sensor for measuring the target, and
   the processor is further programed to
      calculate a position and an orientation of the target based on a plurality of distance measurement data measured by the distance measurement sensor, and
      calculate the moving target of the moving body with respect to the target based on the calculated position and the calculated orientation of the target.
3. The moving body according to claim 2, wherein
   the processor is further programmed to
      calculate a velocity of the target based on the plurality of distance measurement data measured by the distance measurement sensor,
      calculate a first moving target of the moving body based on the calculated position and the calculated orientation of the target,
      calculate a second moving target of the moving body based on the calculated first moving target and the calculated velocity of the target, and
      set the calculated second moving target as the moving target.
4. The moving body according to claim 1, wherein the movement unit is non-holonomic.

* * * * *